Oct. 25, 1955  K. T. MILLER  2,721,383
WIRE AND CABLE WORKING TOOL
Filed Nov. 23, 1953
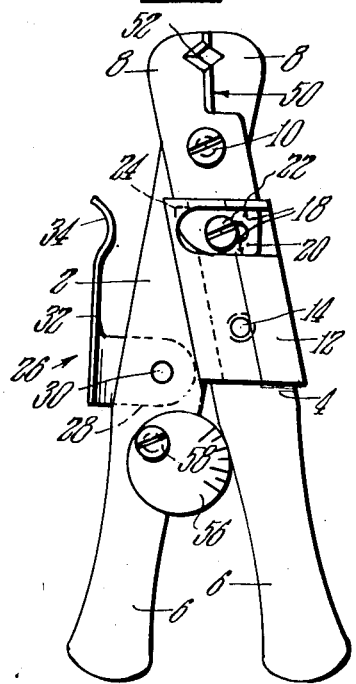
Fig.1
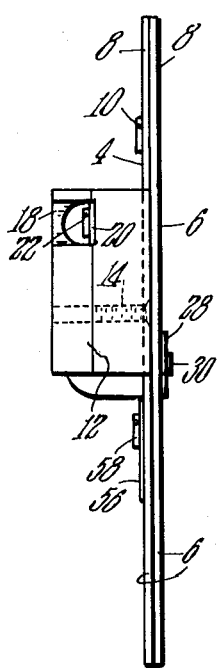
Fig.2.
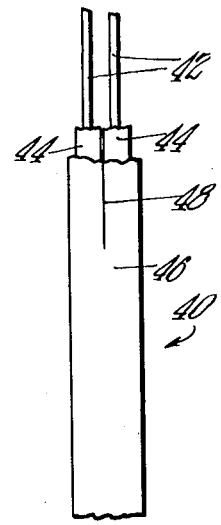
Fig.4
Fig.5.
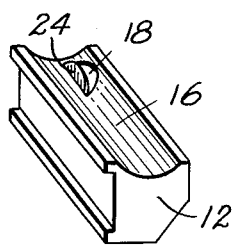
Fig.3.
INVENTOR.
Kenneth T. Miller.
BY
Ross Ross
Atty & Agent

United States Patent Office 2,721,383
Patented Oct. 25, 1955

2,721,383

WIRE AND CABLE WORKING TOOL

Kenneth T. Miller, Longmeadow, Mass.

Application November 23, 1953, Serial No. 393,539

2 Claims. (Cl. 30—91)

This invention relates to improvements in tools for working on electric cables and is directed more particularly to tools for splitting the sheath of a plural conductor cable and stripping insulation from the conductors thereof.

The principal objects of the invention are directed to the provision of a tool which is adapted for severing the outer sheath or covering of a plural conductor cable and which includes means for stripping the insulation from the conductors.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are plan and edge views respectively of a tool embodying the novel features of the invention;

Fig. 3 is a perspective view of the cable guide member shown in Figs. 1 and 2;

Fig. 4 is a plan view of a two conductor cable; and

Fig. 5 is an end view of the cable shown in Fig. 4.

Referring now to the drawings more in detail, the invention will be fully described.

A pair of elongated operating members 2 and 4 have handle portions 6 and jaw portions 8 and are hinged at 10 for relative swinging movements.

A cable guide member 12 is secured to the outermost face of member 4 as by a screw 14 and is provided with an elongated curved guideway 16 extending along the member 4.

A slot 18 provided in a side of member 12 intersects the guideway 16 thereof. A knife blade 20 is secured in the slot 18 by means of a screw 22 and has a sharpened cutting point or edge 24 projecting upwardly relative to the guideway, see Fig. 3.

A hold-down 26 has an ear 28 pivoted at 30 to the member 2. A manually engageable portion 32 of member 26 extends along member 2 so as to overlie the guideway 16 and terminates in an upwardly upturned portion 34.

A length of cable is represented by 40 in Figs. 4 and 5 and includes a pair of conductors 42 covered by insulation 44 and enclosed in a sheath or covering 46.

With the tool held in the fingers of the hand, an end portion of the cable 40 is laid in the guideway 16. The hold-down 26 is pressed downwardly by the thumb so that it presses on the cable to cause the point 24 of the knife to impinge the cable sheath.

With the cable pressed onto the guideway, the cable is pulled therealong so that it is split as represented by 48 in Fig. 4. The split portion of the cable may be removed baring the insulated wires.

The hold-down 26 is of such length as to overlie the blade point 24 so as to avoid the danger of the thumb or finger striking said point.

The adjacent edges 50 of the jaws of the tool are sharpened and are provided with sharpened V notches such as 52. The insulated wires may be placed in the V notches and the jaws brought together to cut through the insulation after which the wire may be pulled on the axis of the notches so as to remove the severed insulation.

A stop 56 is adjustable on the member 2 by means of a screw 58 and limits movement of members 2 and 4 towards one another. This makes it possible to locate the guide relative to the hold-down as may be desired and controls the size of the opening formed by the notches to prevent nicking or cutting of the conductor as the insulation is removed therefrom.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A tool for slitting the covering of a cable comprising in combination, a pair of elongated members having inner and outer flat faces with said inner faces in superposed relation, pivotal connections between said members for relative swinging thereof and providing elongated free manually engageable handle portions, an elongated guide secured to an outer face of one of said members provided with a longitudinal guideway along which a covered cable may be drawn, said guide provided with a slot extending into said guideway, a knife adjustably secured to said guide having a sharpened slitting edge extending through said slot into said guideway, a hold-down pivoted to the other handle portion provided with a manually engageable cable engaging portion arranged to press on a cable over the cutting edge of said knife as the cable is drawn along said guideway to slit the cover of the cable longitudinally.

2. A tool as set forth in claim 1 wherein said guideway is concave in transverse cross section.

References Cited in the file of this patent

UNITED STATES PATENTS

| Number | Name | Date |
|---|---|---|
| 714,109 | Henderson | Nov. 18, 1902 |
| 918,972 | Courtney | Apr. 20, 1909 |
| 1,566,297 | Williams | Dec. 22, 1925 |
| 1,578,438 | Hintz | Mar. 30, 1926 |
| 1,663,748 | Bender | Mar. 27, 1928 |
| 1,692,030 | Friedman | Nov. 20, 1928 |